United States Patent
Yang

(10) Patent No.: US 8,546,964 B2
(45) Date of Patent: Oct. 1, 2013

(54) RECIPROCAL VIBRATION TYPE POWER GENERATOR EQUIPPED WITH A MOVING INNER COLUMNAR MAGNETIC BLOCK SURROUNDED BY AT LEAST ONE COIL SET, AND A MOVING OUTER ANNULAR MAGNETIC BLOCK THAT SURROUNDS THE AT LEAST ONE COIL SET

(76) Inventor: Tai-Her Yang, Dzan-Hwa (TW)

( * ) Notice: Subject to any disclaimer, the term of this patent is extended or adjusted under 35 U.S.C. 154(b) by 0 days.

(21) Appl. No.: 13/071,616

(22) Filed: Mar. 25, 2011

(65) Prior Publication Data

US 2012/0242175 A1 Sep. 27, 2012

(51) Int. Cl.
*F03G 7/08* (2006.01)

(52) U.S. Cl.
USPC .......................................................... 290/1 R

(58) Field of Classification Search
None
See application file for complete search history.

(56) References Cited

U.S. PATENT DOCUMENTS

| | | | |
|---|---|---|---|
| 6,220,719 B1 * | 4/2001 | Vetorino et al. | 362/192 |
| 6,729,744 B2 * | 5/2004 | Mah | 362/192 |
| 6,768,230 B2 * | 7/2004 | Cheung et al. | 310/30 |
| 6,809,427 B2 * | 10/2004 | Cheung et al. | 290/1 R |
| 7,148,583 B1 * | 12/2006 | Shau et al. | 290/1 R |
| 7,332,826 B2 * | 2/2008 | Terzian et al. | 290/1 R |
| 7,688,036 B2 * | 3/2010 | Yarger et al. | 320/137 |
| 2004/0004405 A1 * | 1/2004 | Ausderau | 310/12 |
| 2005/0225181 A1 * | 10/2005 | Tu et al. | 310/12 |
| 2008/0001484 A1 * | 1/2008 | Fuller et al. | 310/15 |
| 2008/0054731 A1 * | 3/2008 | Tu et al. | 310/12 |
| 2008/0296984 A1 * | 12/2008 | Honma et al. | 310/17 |
| 2009/0108590 A1 * | 4/2009 | Mabuchi et al. | 290/1 R |

FOREIGN PATENT DOCUMENTS

JP 2012205496 A * 10/2012
JP 2012205497 A * 10/2012

* cited by examiner

*Primary Examiner* — Tulsidas C Patel
*Assistant Examiner* — S. Mikailoff
(74) *Attorney, Agent, or Firm* — Bacon & Thomas, PLLC

(57) ABSTRACT

A reciprocal vibration type generator includes a cylindrical housing, a coil set seat, and a coil set surrounding an end of the coil set seat, such that an annular space is formed between the coil set seat and an inner wall of the housing, and a cylindrical space extends into the coil set seat. A motion block has a cup-shaped structure from which extends an outer magnetic member, a center column from which extends a columnar magnet, and an inner annular space formed between the cup-shaped structure and the center column. The coil set seat and coil set extend into the inner annular space, the center column and columnar magnet extend into the cylindrical space, and the outer magnetic member extends into the annular space to enable axial reciprocating movement of the motion block relative to the coil set.

19 Claims, 3 Drawing Sheets

RECIPROCAL VIBRATION TYPE POWER GENERATOR EQUIPPED WITH A MOVING INNER COLUMNAR MAGNETIC BLOCK SURROUNDED BY AT LEAST ONE COIL SET, AND A MOVING OUTER ANNULAR MAGNETIC BLOCK THAT SURROUNDS THE AT LEAST ONE COIL SET

BACKGROUND OF THE INVENTION (a) Field of the Invention

The present invention is a novel design for an axial vibration type power generator. The axial vibration type power generator includes a cylindrical housing, a coil set seat, and a coil set surrounding an end of the coil set seat, such that an annular space is formed between the coil set seat and an inner wall of the housing, and a cylindrical space extends into the coil set seat. A corresponding motion block has a cup-shaped structure from which extends an outer magnetic member, a center column from which extends a columnar magnet, and an inner annular space formed between the cup-shaped structure and the center column. The coil set seat and coil set extend into the inner annular space, the center column and columnar magnet extend into the cylindrical space, and the outer magnetic member extends into the annular space to enable axial reciprocating movement of the motion block relative to the coil set, and thereby enable the coil set to generate electric power based on Lenz's Law.

(b) Description of the Prior Art

The conventional axial vibration type power generator utilizes a round columnar magnet adjacent to and axially magnetically coupling with an annular power generation coil set for performing relative axial displacement in response to vibrations, so that the power generation coil set is enabled to generate electric power based on Lenz's Law. However, the coupling magnetic lines of the columnar magnet and the annular power generation coil set are transmitted through air, increasing the magnetic resistance and lowering the voltage of the generated electric power.

SUMMARY OF THE INVENTION

The present invention includes a columnar magnet in a round columnar shape and having different magnetic poles in the axial direction, and an outer magnetic conductive member enclosing the exterior of the columnar magnet. The columnar magnet and outer magnetic conductive member are combined to form a motion block assembly (106) and are coaxially and adjacently disposed to provide a magnetic path that causes the motion block to undergo synchronous axial displacement relative to an annular power generation coil set. The outer diameter of the columnar magnet is smaller than the inner diameter of the outer magnetic conductive member and formed with an annular gap, allowing the annular power generation coil set to pass therebetween Consequently, when the columnar magnet and the outer magnetic conductive member perform reciprocating relative displacement in an axial direction as a result of vibrations, the annular power generation coil set is enabled to generate electric power based on Lenz's Law.

Figure 1:
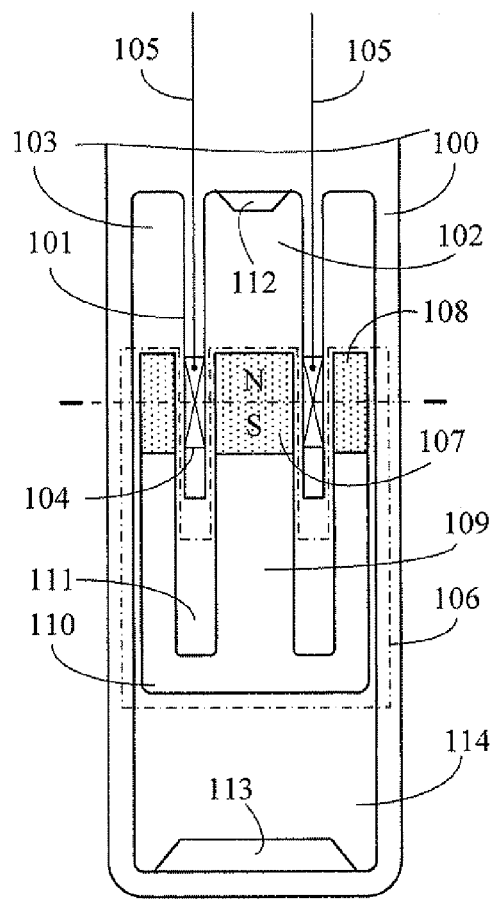
FIG. 1 is a schematic structural view showing an annular power generation coil set having an interior adjacent to and magnetically coupling with a columnar magnet, and an exterior adjacent to and magnetically coupling with an outer magnetic conductive member, according to one embodiment of the present invention.

DESCRIPTION OF MAIN COMPONENT SYMBOLS (100): Housing
(101): Tubular annular coil set seat
(102): Cylindrical space
(103): Annular space
(104)、(204): Annular power generation coil set
(105): Output wires
(106)、(206): Motion block assembly
(107)、(207): Columnar magnet
(108)、(208): Annular outer magnetically conductive member
(109)、(209): Center column of motion block
(110): Cup-shaped structure of motion block
(111): Inner annular space of motion block
(112): First buffer member
(113): Second buffer member
(114): Cylindrical space inside the housing
(117)、(217): Outer magnet
(201): Tubular annular coil set partition seat
(210): Cup-shaped structure partition ring

DETAILED DESCRIPTION OF THE PREFERRED EMBODIMENTS

The conventional axial vibration type power generator utilizes a round columnar magnet adjacent to and axially magnetically coupling with an annular power generation coil set for performing axial vibrating displacement, so that the power generation coil set is enabled to generate electric power based on Lenz's Law. However, the coupling magnetic lines of the columnar magnet and the annular power generation coil set are transmitted through air, and thereby the magnetic resistance is relatively large and the voltage of the generated electric power is therefore lowered.

The present invention includes a columnar magnet having a round columnar shape and different magnetic poles in an axial direction, and an outer magnetically conductive member enclosing the exterior of the columnar magnet, the columnar magnet and outer magnetic conductive member being combined to form a motion block assembly (106). The columnar magnet and outer magnetically conductive member are coaxial and disposed adjacent to each other to provide a magnetic path enabling synchronous axial displacement. The outer diameter of the columnar magnet is smaller than the inner diameter of the outer magnetically conductive member and formed with an annular gap to allow an annular power generation coil set to pass therebetween, so that when the columnar magnet and the outer magnetically conductive member perform reciprocal relative displacement in an axial direction as a result of vibrations, the annular power generation coil set is enabled to generate electric power based on Lenz's Law.

The present invention is a novel design for an axial vibration type power generator, wherein the outer end of the location where the columnar magnet passes the annular power generation coil set has an outer magnetic conductive member installed thereon for reducing the magnetic resistance generated while the magnetic poles at two ends of the columnar magnet pass the annular power generation coil set, the columnar magnet and the outer magnetic conductive member being jointly combined to form a motion block assembly (106) that undergoes synchronous axial displacement relative to the annular power generation coil set, and enables the annular power generation coil set to generate electric power based on Lenz's Law.

Figure 2:
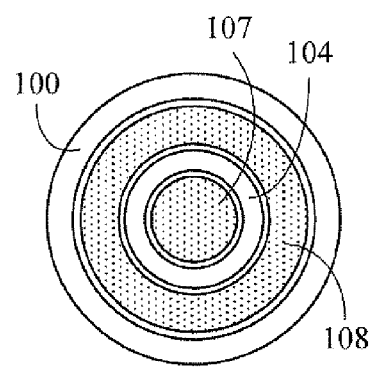
FIG. 2 is a cross-sectional view of the embodiment of FIG. 1.

FIG. 1 is a schematic structural view showing an annular power generation coil set (104) having an interior adjacent to and magnetically coupling with a columnar magnet (107), and an exterior adjacent to and magnetically coupling with an outer magnetic conductive member (108), according to a first embodiment of the present invention and FIG. 2 is a cross-sectional view of the annular power generation coil set of FIG. 1.

As shown in FIG. 1 and FIG. 2, this embodiment includes the following features:

A housing (100) is constituted by a material having poor magnetic conduction and poor electrical conduction, formed in a hollow cylindrical shape and having an inner end from which inwardly extends a tubular annular coil set seat (101) with a distal end connecting to the annular power generation coil set (104). An annular space (103) is formed between the tubular annular coil set seat (101) and the inner space of the housing (100), the center of the tubular annular coil set seat (101) is formed with a round space (102), and the annular power generation coil set (104) is connected to output wires (105) for outputting the electric power generated by the annular power generation coil set (104).

A motion block assembly (106) is constituted by a material having poor magnetic conduction and poor electric conduction, and is provided with a cup-shaped structure that forms a motion block (110) for combining with the outer magnetic conductive member (108). The center of the cup-shaped structure of motion block (110) is provided with a center column (109) for combining with the columnar magnet (107), and the periphery of the central column of motion block (109) and the cup-shaped structure of motion block (110) form an inner annular space (111) for receiving the annular power generation coil set (104) and the tubular annular coil set seat (101), and for allowing the motion block (110) to undergo axial displacement relative to the coil set (104) and the coil set seat (101) as a result of vibrations. A round space (102) of the tubular annular coil set seat (101) is provided for receiving the columnar magnet (107) and the center column (109) of motion block (110) and for allowing the columnar magnet (107) and motion block (110) to perform axial displacement relative to the annular coil set (104) and the coil set seat (101).

A first buffer member (112) is installed between the round space (102) of the tubular annular coil set seat (101) and the inner wall of the housing (100) for serving as a buffer while the center column (109) and the columnar magnet (107) of the motion block assembly (106) and the outer magnetic conductive member (108) perform axial displacement.

The above-mentioned columnar magnet (107) passes through the annular power generation coil set (104) as it undergoes reciprocal axial displacement together with the outer magnetic conductive member (108), enabling the annular power generation coil set (104) to generate power.

The cylindrical space (114) inside the housing (100) is provided for being receiving the outer periphery of the motion block assembly (106) and allowing the relative axial displacement, and a second buffer member (113) is installed between the motion block assembly (106) and the cylindrical space (114) inside the housing (100) for serving as a buffer when the motion block assembly (106) performs the relative axial displacement.

Figure 3:
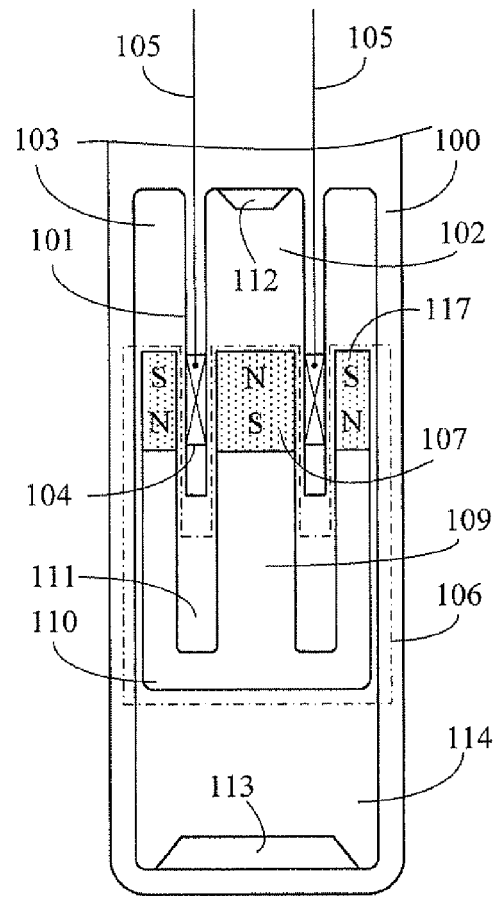
FIG. 3 is a schematic structural view showing an annular power generation coil set having an interior adjacent to and magnetically coupling with a columnar magnet, and an exterior adjacent to and magnetically coupling with an outer magnet having a polarity opposite that of the columnar magnet, according to a second embodiment of the present invention.

FIG. 3 is a schematic structural view showing an annular power generation coil set (104) having an interior adjacent to and magnetically coupling with the columnar magnet (107), and an exterior adjacent to and magnetically coupling with the outer magnet (117) and relatively installed with the same polarity as the columnar magnet (107), according to a second embodiment of the present invention.

The cross-sectional view of FIG. 3 is the same as that shown in FIG. 2.

As shown in FIG. 3, this embodiment includes the following features:

A housing (100) is constituted by a material having poor magnetic conduction and poor electric conduction, and formed in a hollow cylindrical shape having an inner end from which a tubular annular coil set seat (101) extends inwardly. A distal end of the tubular annular coil set seat (101) connects to an annular power generation coil set (104), and an annular space (103) is formed between the tubular annular coil set seat (101) and an inner hole of the housing (100). The center of the tubular annular coil set seat (101) is formed with a round space (102), and the annular power generation coil set (104) is connected to output wires (105) for outputting the electric power generated by the annular power generation coil set (104).

A motion block assembly (106) is constituted by a material having poor magnetic conduction and poor electric conduction, and is provided with a cup-shaped structure that forms a motion block (110) for combining with an outer magnet (117). The center of the cup-shaped structure of motion block (110) is provided with a center column (109) for combining with a columnar magnet (107), and the periphery of the central column (109) and the cup-shaped structure of the motion block (110) form an inner annular space (111) for accommodating the annular power generation coil set (104) and the tubular annular coil set seat (101) and allowing the magnetic block (110) to undergo reciprocating axial displacement relative to the coil set (104) and the coil set seat (101). The round space (102) of the tubular annular coil set seat (101) accommodates the columnar magnet (107) and the center column (109) and allows the columnar magnet (107) and the center column (109) to perform the relative axial displacement.

A first buffer member (112) is installed between the round space (102) of the tubular annular coil set seat (101) and the inner wall of the housing (100) for serving as a buffer while the center column (109) and the columnar magnet (107) of the motion block (110) and the outer magnetic conductive member (108) perform the axial displacement.

The columnar magnet (107) performs axial reciprocal motion in response to vibrations to cause the outer magnet (117) to pass through the annular power generation coil set (104), enabling the annular power generation coil set (104) to generate power.

The cylindrical space (114) inside the housing (100) receives the outer periphery of the motion block assembly (106) to enable the motion block assembly (106) to perform the above-described relative axial displacement, and a second buffer member (113) is installed between the motion block assembly (106) and the cylindrical space (114) inside the housing (100) to serve as a buffer when the motion block assembly (106) performs the axial displacement.

Figure 4:
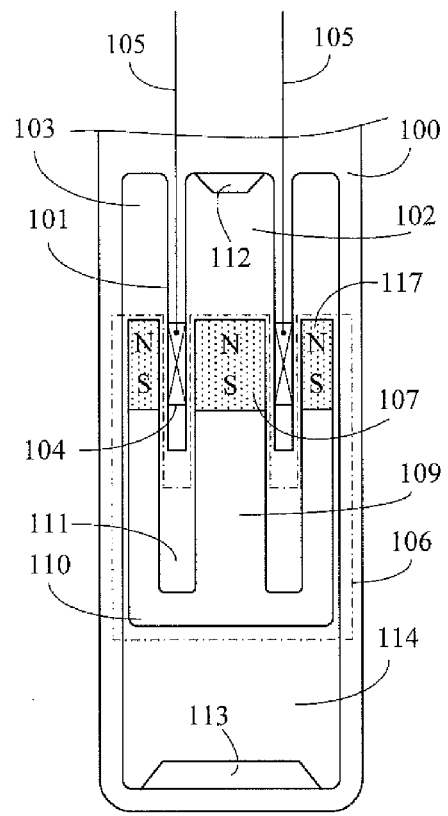
FIG. 4 is a schematic structural view showing an annular power generation coil set having an interior adjacent to and magnetically coupling with a columnar magnet, and an exterior adjacent to and magnetically coupling with an outer magnet having a same polarity as that of the columnar magnet, according to a third embodiment of the present invention.

The magnetic pole surfaces of the columnar magnet (107) and the columnar magnet (207) may have the same polarity relative to the annular power generation coil set (104) as shown in FIG. 3 or, as shown in FIG. 4, different polarities.

Except for the relative same polarities of the columnar magnet (107) and outer magnet (117), the structure shown in FIG. 4 is the same as that shown in FIG. 3, with the interior of the annular power generation coil set (104) being adjacent to and magnetically coupling with the columnar magnet (107), and the exterior thereof being adjacent to and magnetically coupling with the outer magnet (117) and relatively installed to have the same polarity as the columnar magnet (107), according to a third embodiment of the present invention. The cross-sectional view of the embodiment of FIG. 4 is the same as that shown in FIG. 2.

Figure 5:
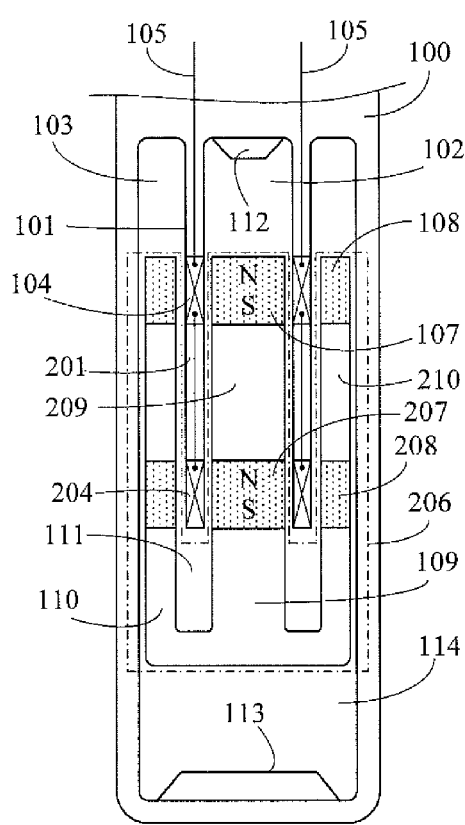
FIG. 5 is a schematic structural view showing annular power generation coil sets arranged in a multiple segment format, the interiors of the annular power generation coil sets being adjacent to and magnetically coupling with columnar magnets and the exteriors being adjacent to and magnetically coupling with outer magnetic conductive members according to a fourth embodiment of the present invention.

FIG. 5 is a schematic structural view showing annular power generation coil sets (104), (204) arranged in a multiple segment format, the interiors of the annular power generation coil sets (104), (204) being adjacent to and magnetically coupling with the columnar magnets (107), (207), and the exteriors thereof being adjacent to and magnetically coupling with the outer magnetic conductive members (108), (208), according to a fourth embodiment of the present invention. The cross-sectional view of FIG. 5 is again the same as that shown in FIG. 2.

The embodiment of FIG. 5 has the following features:

A housing (100) is constituted by a material having poor magnetic conduction and poor electric conduction, and is formed in a hollow cylindrical shape having one inner end from which a tubular annular coil set seat (101) inwardly extends with its distal end being combined with an annular power generation coil set (104), with a tubular annular coil set partition seat (201), and extendedly with an annular power generation coil set (204). An annular space (103) is formed between the tubular annular coil set seat (101) and an inner hole of the housing (100), and a center of the tubular annular coil set seat (101) is formed with a round space (102). The annular power generation coil sets (104), (204) are normal-polarity connected in parallel or in series to allow a voltage to accumulate during power generation, and are connected to output wires (105) for outputting the electric power generated by the annular power generation coil sets (104), (204).

A motion block assembly (206) is constituted by a material having poor magnetic conduction and poor electric conduction, and is provided with a cup-shaped structure that forms a motion block (110) for combining with an outer magnetic conductive member (108), and that is further combined with a cup-shaped structure partition ring (210) and extendedly combined with an outer magnetic conductive member (208). The center of the cup-shaped structure of motion block (110) is provided with a center column (109) for combining with a columnar magnet (107), and is further combined with another center column (209) of the motion block (110) and extendedly combined with another columnar magnet (207). The periphery of the central column (109) and the cup-shaped structure of motion block (110) form an inner annular space (111) of the motion block (110) for receiving the annular power generation coil sets (104), (204), the tubular annular coil set partition seat (201), and the tubular annular coil set seat (101) to allow relative axial displacement. The tubular annular coil set seat (101) and the round space (102) of the tubular annular coil set partition seat (201) are arranged to receive the columnar magnets (107), (207) and the center column of motion block (109), (209) to also allow relative axial displacement.

A first buffer member (112) is installed between the round space (102) of the tubular annular coil set seat (101) and the inner wall of the housing (100) for serving as a buffer while the center columns (109), (209) and the columnar magnets (107), (207) of the motion block and the outer magnetic conductive members (108), (208) perform the relative axial displacement.

The interval between the columnar magnet (107) and the columnar magnet (207), which are separated by the center column of motion block (209), and the interval between the annular power generation coil set (104) and the annular power generation coil set (204), which are separated by the tubular annular coil set partition seat (201), enable the annular power generation coil set (104) and the annular power generation coil set (204) to generate a voltage having the same phase when the columnar magnet (107) and the columnar magnet (207), and the outer magnetic conductive member (108) and the outer magnetic conductive member (208), undergo axial reciprocal movement in response to vibrations that causes them to pass the annular power generation coil set (104) and the annular power generation coil set (204).

A cylindrical space (114) inside the housing (100) receives the outer periphery of the motion block assembly (106) to allow relative axial displacement of the motion block assembly (106), and a second buffer member (113) is installed between the motion block assembly (106) and the cylindrical space (114) inside the housing (100) for serving as a buffer when the motion block assembly (106) performs the axial displacement.

Figure 6:
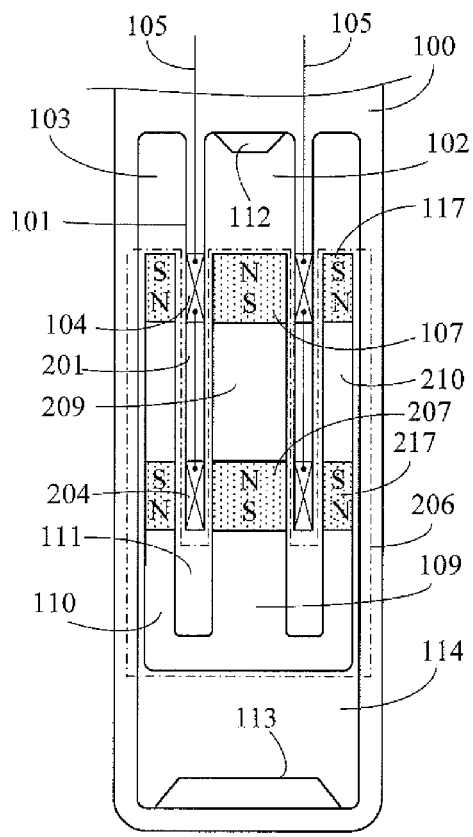
FIG. 6 is a schematic structural view showing annular power generation coil sets arranged in a multiple segment format, the interiors of the annular power generation coil sets being adjacent to and magnetically coupling with columnar magnets and the exteriors being adjacent to and magnetically coupling with outer magnets arranged in a multiple segment format and having a polarity opposite that of the columnar magnets, according to a fifth embodiment of the present invention.

FIG. 6 is a schematic structural view showing annular power generation coil sets (104), (204) arranged in a multiple segment format, the interior of the annular power generation coil sets (104), (204) being adjacent to and magnetically coupling with the columnar magnets (107), (207), and the exterior thereof being adjacent to and magnetically coupling with the outer magnets (117), (217) arranged in a multiple segment format and relatively installed to have the same polarity as the columnar magnet (107), according to a fifth embodiment of the present invention. The cross-sectional view of the embodiment of FIG. 6 is the same as that shown in FIG. 2.

The embodiment of FIG. 6 includes the following features:

A housing (100) is constituted by a material having poor magnetic conduction and poor electric conduction, and formed in a hollow cylindrical shape having one inner end from which a tubular annular coil set seat (101) extends inwardly with its distal end being combined with an annular power generation coil set (104), and then combined with a tubular annular coil set partition seat (201) and extendedly combined with an annular power generation coil set (204). An annular space (103) is formed between the tubular annular coil set seat (101) and an inner hole of the housing (100), and a center of the tubular annular coil set seat (101) is formed with a round space (102). The annular power generation coil sets (104), (204) are normal-polarity connected in parallel or in series to enable voltage to accumulate during power generation, and are connected to output wires (105) for outputting electric power generated by the annular power generation coil sets (104), (204).

A motion block assembly (206) is constituted by a material having poor magnetic conduction and poor electric conduction, and is provided with a cup-shaped structure that forms a motion block (110) for combining with an outer magnet (117), a cup-shaped structure partition ring (210), and an outer magnet (217) The center of the cup-shaped structure of motion block (110) is provided with a center column (109) for combining with the columnar magnet (107), and a center column (209) for combining with a columnar magnet (207). The periphery of the central column of motion block (109) and the cup-shaped structure of motion block (110) form an inner annular space (111) for receiving the annular power generation coil sets (104), (204), a tubular annular coil set partition seat (201), and a tubular annular coil set seat (101) and allowing relative axial displacement. The tubular annular coil set seat (101) and a round space (102) of the tubular annular coil set partition seat (201) receives the columnar magnets (107), (207) and the center columns (109), (209) of motion block (110) and allows the above-mentioned components to perform the relative axial displacement.

A first buffer member (112) is installed between the round space (102) of the tubular annular coil set seat (101) and the inner wall of the housing (100) for serving as a buffer while the center columns (109), (209) and the columnar magnets (107), (207) of the motion block and the outer magnets (117), (217) perform axial displacement.

An interval between the columnar magnet (107) and the columnar magnet (207), and the outer magnet (117) and the outer magnet (217), which are separated by the center column of motion block (209), and an interval between the annular power generation coil set (104) and the annular power generation coil set (204), which are separated by the tubular annular coil set partition seat (201), enable the annular power generation coil set (104) and the annular power generation coil set (204) to generate voltage having the same phase when the columnar magnet (107) and the columnar magnet (207), and the outer magnet (117) and the outer magnet (217), perform axial reciprocal vibration-responsive movement to pass through the annular power generation coil set (104) and the annular power generation coil set (204).

A cylindrical space (114) inside the housing (100) receives the outer periphery of the motion block assembly (106) to allow the relative axial displacement, and a second buffer member (113) is installed between the motion block assembly (106) and the cylindrical space (114) inside the housing (100) to serve as a buffer when the motion block assembly (106) performs the axial displacement.

As shown in FIG. 6, the magnetic pole surfaces of the columnar magnet (107) and the columnar magnet (207) relative to the annular power generation coil set (104), and the magnetic pole surfaces of the outer magnet (117) and the outer magnet (217) relative to the annular power generation coil set (204), have the same polarity. However, as shown in FIG. 7, the magnetic pole surfaces of the columnar magnet (107) and the columnar magnet (207) relative to the annular power generation coil set (104), and the magnetic pole surfaces of the outer magnet (117) and the outer magnet (217) relative to the annular power generation coil set (204) may also have different polarities.

Figure 7:
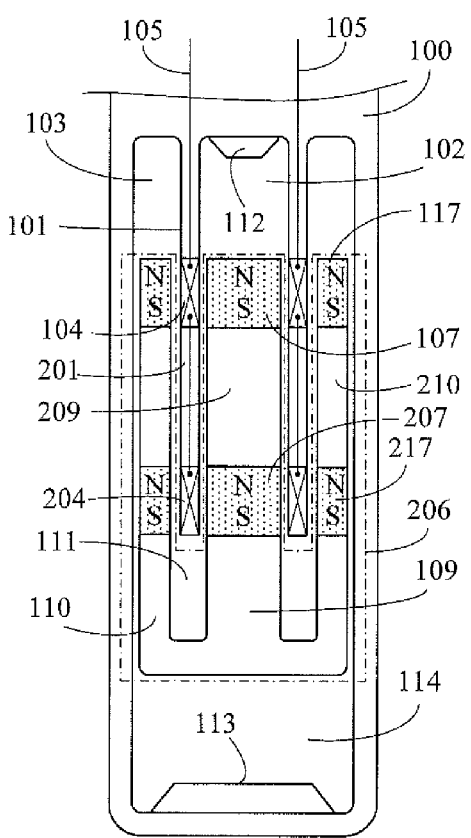
FIG. 7 is a schematic structural view showing annular power generation coil sets arranged in a multiple segment format, the interiors of the annular power generation coil sets being adjacent to and magnetically coupling with columnar magnets and the exteriors being adjacent to and magnetically coupling with outer magnets arranged in a multiple segment format and having a same polarity as the columnar magnets, according to a sixth embodiment of the present invention.

As shown in FIG. 7, annular power generation coil sets (104), (204) is arranged in the same multiple segment format, the interior of the annular power generation coil sets (104), (204) being adjacent to and magnetically coupling with the columnar magnets (107), (207), and the exterior thereof being adjacent to and magnetically coupling with the outer magnets (117), (217) arranged in the multiple segment format. This structure is the same as shown in FIG. 6, but with relatively different polarities, according to a sixth embodiment of the present invention. Again, the cross-sectional view of the embodiment of FIG. 7 is the same as that shown in FIG. 2.

The embodiments of FIGS. 5-7 may be varied as follows:

The columnar magnet (107), the columnar magnet (207), the annular power generation coil set (104), the annular power generation coil set (204), the outer magnetic conductive member (108) and the outer magnetic conductive member (208) shown in FIG. 5 may all be composed of two units or more than two units.

The columnar magnet (107), the columnar magnet (207), the annular power generation coil set (104), the annular power generation coil set (204), the outer magnet (117) and the outer magnet (217) shown in FIG. 6 and FIG. 7 may all composed of two units or more than two units.

The columnar magnet (107), the columnar magnet (207), the outer magnetic conductive member (108) and the outer magnetic conductive member (208) shown in FIG. 5 may all be composed of two units or more than two units, and the annular power generation coil set (104) composed of one unit.

The columnar magnet (107), the columnar magnet (207), the outer magnet (117) and the outer magnet (217), shown in FIG. 6 and FIG. 7, may all be composed of two units or more than two units, and the annular power generation coil set (104) composed of one unit.

The invention claimed is:

1. A reciprocal vibration type power generator, comprising:
   a housing (100) having a hollow cylindrical shape;
   a tubular annular coil set seat (101) extending inwardly from one end of the housing (100);
   an annular power generation coil set (104) installed in a distal end of the tubular annular coil set seat (101), wherein:
      an annular space (103) is formed between the tubular annular coil set seat (101) and an inner wall of the housing (100),
      a cylindrical space (102) extends into the tubular annular coil set seat (101) from the distal end, and
      the annular power generation coil set (104) includes output wires (105) for outputting power generated in the annular power generation coil set (104);
   a motion block assembly (106) including a motion block (110), said motion block (110) having a cup-shaped structure from which extends an annular outer magnetic member (108 or 117), and said motion block (110) further including a center column (109) from which extends a columnar magnet (107), an inner annular space (111) being formed between the cup-shaped structure of the motion block (110) and a periphery of the center column (109), and between the annular outer magnetic member (108 or 117) and a periphery of the columnar magnet (107), wherein:
      said tubular annular coil set seat (101) and annular power generation coil set (104) extend into said inner annular space (111), said center column (109) and columnar magnet (107) extend into said cylindrical space (102), and said annular outer magnetic member (108 or 117) extends into said annular space (103), to enable reciprocal relative axial movement between the motion block (110) and the tubular annular coil set seat (101) when said generator is vibrated, said relative movement between the motion block (110) and the tubular annular coil set seat (101) causing said columnar magnet (107) and said annular outer magnetic member (108 or 117) to move reciprocally past the annular power generation coil set (104) and thereby generate power.

2. A reciprocal vibration type power generator as claimed in claim 1, further comprising:
   a first buffer member (112) installed in the cylindrical space (102) of the tubular annular coil set seat (101) for serving as a buffer when the center column (109), the columnar magnet (107), and the annular outer magnetic member (108 or 117) of the motion block assembly (106) move axially past the annular power coil set (104) towards said one end of the housing (100); and
   a second buffer member (113) installed in a cylindrical space (114) at an opposite end of the housing (100) from said one end of the housing for serving as a buffer when the center column (109), the columnar magnet (107), and the annular outer magnetic member (108 or 117) of the motion block assembly (106) move axially past the annular power coil set (104) towards said opposite end of the housing (100).

3. A reciprocal vibration type power generator as claimed in claim 1, wherein said annular outer magnetic member is a magnetically conductive member (108).

4. A reciprocal vibration type power generator as claimed in claim 1, wherein said annular outer magnetic member is a magnet (117) having a different polarity than said columnar magnet (107).

5. A reciprocal vibration type power generator as claimed in claim 1, wherein said annular outer magnetic member is a magnet (117) having a same polarity as said columnar magnet (107).

6. A reciprocal vibration type power generator as claimed in claim 1, further comprising a second annular power generation coil set (204) installed in a second partition seat (201) and also further comprising a cup-shaped structure partition ring (210), wherein said motion block (110) includes:
   a cup-shaped structure partition ring (210) having a first end joined to the first annular outer magnetic member (108 or 117) and a second end joined to a second annular outer magnetic member (208 or 217);
   a second center column (209) having a first end joined to the columnar magnet (107) and a second end joined to a second columnar magnet (207),
   wherein:
      said inner annular space (111) also extends between the cup-shaped structure partition ring (210) and the second center column (209), and between the second annular outer magnetic member (208 or 217) and a periphery of the second columnar magnet (207),
      said second center column (209) and second columnar magnet (207) also extend into said cylindrical space (102), and
      said second annular outer magnetic member (208 or 217) extends into said annular space (103), and
      relative movement between the cup-shaped structure of motion block (110) and the cup-shaped structure partition ring and the tubular annular coil set seat (101) causes said first and second columnar magnets (107, 207) and said first and second annular outer magnetic members (108 or 117, 208 or 217) to move reciprocally past the respective first and second annular power generation coil sets (104, 204) and thereby generate power in both the first and second annular power generation coil sets (104, 204).

7. A reciprocal vibration type power generator as claimed in claim 6, further comprising:
   a first buffer member (112) installed in the cylindrical space (102) of the tubular annular coil set seat (101) for serving as a buffer when the cup-shaped structure of motion block (110) and the cup-shaped structure partition ring (210) move axially past the first and second annular power coil sets (104, 204) towards said one end of the housing (100); and
   a second buffer member (113) installed in a cylindrical space (114) at an opposite end of the housing (100) from said one end of the housing for serving as a buffer when the cup-shaped structure of motion block (110) and the cup-shaped structure partition ring (210) move axially past the first and second annular power coil sets (104, 204) towards said opposite end of the housing (100).

8. A reciprocal vibration type power generator as claimed in claim 6, wherein said first annular outer magnetic member is a magnetically conductive member (108) and said second annular outer magnetic member is also a magnetically conductive member (208).

9. A reciprocal vibration type power generator as claimed in claim 8, wherein said first annular power coil set (104) is separated from said second annular power coil set (204) by a partition seat (201), wherein said partition seat (201) is at least approximately equal in length to said cup-shaped structure partition ring (210) that separates said first and second magnetically conductive members (108, 208), wherein said partition seat (201) is also at least approximately equal in length to said second center column (209) that separates said first and second columnar magnets (107, 207), and wherein said length enables said first and second power coil sets (104, 204) to generate voltages having a same phase.

10. A reciprocal vibration type power generator as claimed in claim 6, wherein said first annular outer magnetic member is an annular outer magnet (117) having a different polarity than said first columnar magnet (107), and said second annular outer magnetic member is an annular outer magnet (217) having a different polarity than said second columnar magnet (207).

11. A reciprocal vibration type power generator as claimed in claim 10, wherein said first annular power coil set (104) is separated from said second annular power coil set (204) by a partition seat (201), wherein said partition seat (201) is at least approximately equal in length to said cup-shaped structure partition ring (210) that separates said first and second annular outer magnets (117, 217), wherein said partition seat (201) is also at least approximately equal in length to said second center column (209) that separates said first and second columnar magnets (107, 207), and wherein said length enables said first and second power coil sets (104, 204) to generate voltages having a same phase.

12. A reciprocal vibration type power generator as claimed in claim 6, wherein said first annular outer magnetic member is a magnet (117) having a same polarity as said first columnar magnet (107), and said second annular outer magnetic member is a magnet (217) having a same polarity as said second columnar magnet (207).

13. A reciprocal vibration type power generator as claimed in claim 12, wherein said first annular power coil set (104) is separated from said second annular power coil set (204) by a partition seat (201), wherein said partition seat (201) is at least approximately equal in length to said cup-shaped structure partition ring (210) that separates said first and second annular outer magnets (117, 217), wherein said partition seat (201) is also at least approximately equal in length to said second center column (209) that separates said first and second columnar magnets (107, 207), and wherein said length enables said first and second power coil sets (104, 204) to generate voltages having a same phase.

14. A reciprocal vibration type power generator as claimed in claim 6, wherein said first and second columnar magnets (107, 207) and said first and second annular outer magnetic members (108 or 117, 208 or 217) are each composed of two or more magnetic units.

15. A reciprocal vibration type power generator as claimed in claim 14, wherein the annular power generation coil sets (104, 204) are each composed of two or more coil units.

16. A reciprocal vibration type power generator as claimed in claim 14, wherein the annular power generation coil sets (104, 204) are each composed of a single coil unit.

17. A reciprocal vibration type power generator as claimed in claim 1, wherein said columnar magnet (107) and said annular outer magnetic member (108 or 117) are each composed of two or more magnetic units.

18. A reciprocal vibration type power generator as claimed in claim 17, wherein the annular power generation coil set (104) is composed of two or more coil units.

19. A reciprocal vibration type power generator as claimed in claim 17, wherein the annular power generation coil set (104) is composed of a single coil unit.

* * * * *